United States Patent [19]

Ivey

[11] Patent Number: 5,879,112
[45] Date of Patent: Mar. 9, 1999

[54] WATER SUPPLY LINE TAPPING TOOL

[76] Inventor: Roy M. Ivey, 750 Alpine Dr., Sevierville, Tenn. 37876

[21] Appl. No.: 960,974

[22] Filed: Oct. 30, 1997

[51] Int. Cl.⁶ .................................................. B23B 41/02
[52] U.S. Cl. ..................... 408/204; 137/318; 408/72 R; 408/111
[58] Field of Search ................................ 408/72 R, 204, 408/111; 137/318

[56] References Cited

U.S. PATENT DOCUMENTS

| | | | |
|---|---|---|---|
| 3,870,431 | 3/1975 | Luckenbill et al. | 408/111 |
| 3,922,107 | 11/1975 | Fowler | 408/67 |
| 3,995,655 | 12/1976 | Sands | 408/67 |
| 4,902,174 | 2/1990 | Thompson et al. | 408/111 |
| 5,076,311 | 12/1991 | Marschke | 408/30 |
| 5,286,070 | 2/1994 | Williams | 137/318 |
| 5,659,935 | 8/1997 | Lo-Pinto et al. | 408/99 |

*Primary Examiner*—Andrea L. Pitts
*Assistant Examiner*—Adesh Bhargava

[57] ABSTRACT

A new water supply line tapping tool for allowing plumbers to tap into a main water supply line. The inventive device includes a main shaft having a first end and a second end. The first end is adapted for coupling with a standard portable electric drill. The main shaft has a threaded hole therein disposed inwardly of the second end. The threaded hole receives a screw therein. The second end has an internally threaded receiving collar disposed thereon. A hole saw is coupled with the receiving collar on the second end of the main shaft. The hole saw has an arbor portion. The arbor portion has an internal end extending inwardly of the second end of the main shaft for being engaged by the screw extending within the threaded hole. A sleeve is slidably disposed on the main shaft for coupling with a saddle valve.

3 Claims, 2 Drawing Sheets

WATER SUPPLY LINE TAPPING TOOL

BACKGROUND OF THE INVENTION

1. Field of the Invention

The present invention relates to hole saw assemblies and more particularly pertains to a new water supply line tapping tool for allowing plumbers to tap into a main water supply line.

2. Description of the Prior Art

The use of hole saw assemblies is known in the prior art. More specifically, hole saw assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art hole saw assemblies include U.S. Pat. No. 4,955,984 to Cuevas; U.S. Pat. No. 5,292,210 to Nowick; U.S. Pat. No. 4,101,238 to Reibetanz et al.; U.S. Pat. No. 3,880,546 to Segal; U.S. Pat. No. 4,072,441 to LaPointe; and U.S. Pat. No. Des. 288,985 to Ali et al.

While these devices fulfill their respective, particular objectives and requirements, the aforementioned patents do not disclose a new water supply line tapping tool. The inventive device includes a main shaft having a first end and a second end. The first end is adapted for coupling with a standard portable electric drill. The main shaft has a threaded hole therein disposed inwardly of the second end. The threaded hole receives a screw therein. The second end has an internally threaded receiving collar disposed thereon. A hole saw is coupled with the receiving collar on the second end of the main shaft. The hole saw has an arbor portion. The arbor portion has an internal end extending inwardly of the second end of the main shaft for being engaged by the screw extending within the threaded hole. A sleeve is slidably disposed on the main shaft for coupling with a saddle valve.

In these respects, the water supply line tapping tool according to the present invention substantially departs from the conventional concepts and designs of the prior art, and in so doing provides an apparatus primarily developed for the purpose of allowing plumbers to tap into a main water supply line.

SUMMARY OF THE INVENTION

In view of the foregoing disadvantages inherent in the known types of hole saw assemblies now present in the prior art, the present invention provides a new water supply line tapping tool construction wherein the same can be utilized for allowing plumbers to tap into a main water supply line.

The general purpose of the present invention, which will be described subsequently in greater detail, is to provide a new water supply line tapping tool apparatus and method which has many of the advantages of the hole saw assemblies mentioned heretofore and many novel features that result in a new water supply line tapping tool which is not anticipated, rendered obvious, suggested, or even implied by any of the prior art hole saw assemblies, either alone or in any combination thereof.

To attain this, the present invention generally comprises a main shaft having a first end and a second end. The first end is adapted for coupling with a standard portable electric drill. The main shaft has a threaded hole therein disposed inwardly of the second end. The threaded hole receives a screw therein. The second end has an internally threaded receiving collar disposed thereon. A hole saw is coupled with the receiving collar on the second end of the main shaft. The hole saw has an arbor portion. The arbor portion has an internal end extending inwardly of the second end of the main shaft for being engaged by the screw extending within the threaded hole. A cylindrical side wall of the hole saw has a pair of diametrically opposed slots therethrough. A sleeve is slidably disposed on the main shaft. The sleeve has an internally threaded open first end, an intermediate hollow chamber and a closed second end. The internally threaded open first end is dimensioned for coupling with a saddle valve.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new water supply line tapping tool apparatus and method which has many of the advantages of the hole saw assemblies mentioned heretofore and many novel features that result in a new water supply line tapping tool which is not anticipated, rendered obvious, suggested, or even implied by any of the prior art hole saw assemblies, either alone or in any combination thereof.

It is another object of the present invention to provide a new water supply line tapping tool which may be easily and efficiently manufactured and marketed.

It is a further object of the present invention to provide a new water supply line tapping tool which is of a durable and reliable construction.

An even further object of the present invention is to provide a new water supply line tapping tool which is susceptible of a low cost of manufacture with regard to both materials and labor, and which accordingly is then susceptible of low prices of sale to the consuming public, thereby making such water supply line tapping tool economically available to the buying public.

Still yet another object of the present invention is to provide a new water supply line tapping tool which provides in the apparatuses and methods of the prior art some of the advantages thereof, while simultaneously overcoming some of the disadvantages normally associated therewith.

Still another object of the present invention is to provide a new water supply line tapping tool for allowing plumbers to tap into a main water supply line.

Yet another object of the present invention is to provide a new water supply line tapping tool which includes a main shaft having a first end and a second end. The first end is adapted for coupling with a standard portable electric drill. The main shaft has a threaded hole therein disposed inwardly of the second end. The threaded hole receives a screw therein. The second end has an internally threaded receiving collar disposed thereon. A hole saw is coupled with the receiving collar on the second end of the main shaft. The hole saw has an arbor portion. The arbor portion has an internal end extending inwardly of the second end of the main shaft for being engaged by the screw extending within the threaded hole. A sleeve is slidably disposed on the main shaft for coupling with a saddle valve.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
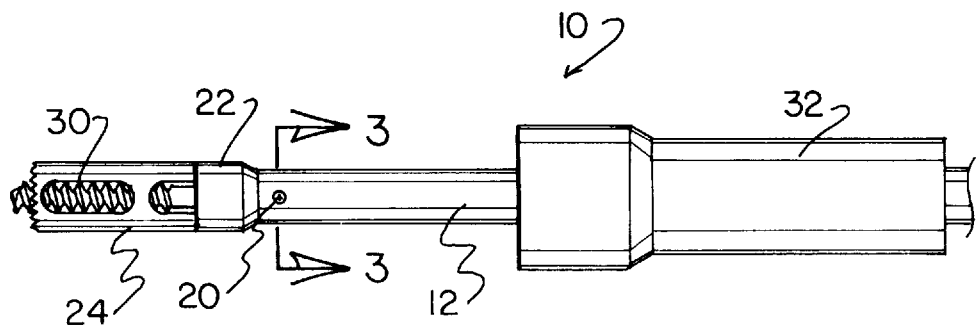
FIG. 1 is a side view of a new water supply line tapping tool according to the present invention.
Figure 2:
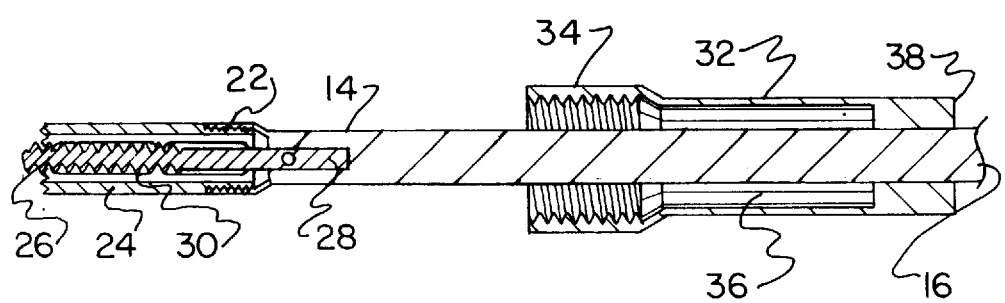
FIG. 2 is a side view of the present invention illustrated in cross-section.
Figure 3:
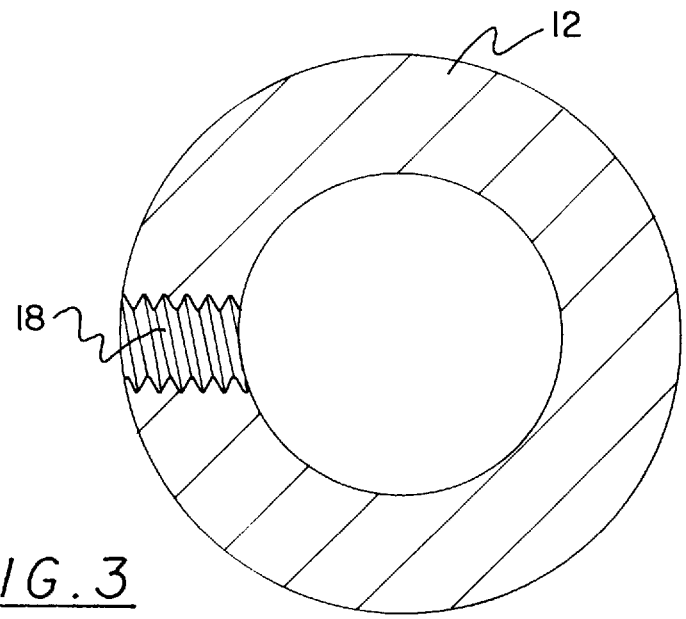
FIG. 3 is a cross-sectional view of the present invention as taken along line 3—3 of FIG. 1.
Figure 4:
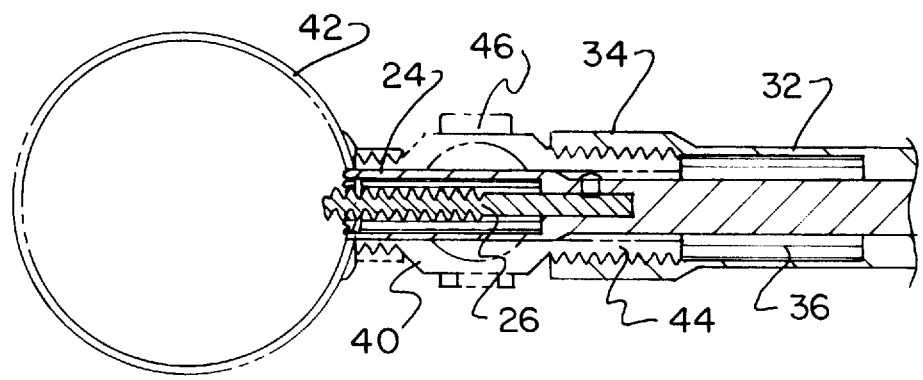
FIG. 4 is a cross-sectional view of the present invention illustrated in use.

With reference now to the drawings, and in particular to FIGS. 1 through 4 thereof, a new water supply line tapping tool embodying the principles and concepts of the present invention and generally designated by the reference numeral 10 will be described.

As best illustrated in FIGS. 1 through 4, the water supply line tapping tool 10 comprises a main shaft 12 having a first end 14 and a second end 16. The first end 14 is adapted for coupling with a standard portable electric drill. The main shaft 12 has a threaded hole 18 therein disposed inwardly of the second end 16. The threaded hole 18 receives a screw 20 therein. The second end 16 has an internally threaded receiving collar 22 disposed thereon.

A hole saw 24 is coupled with the receiving collar 22 on the second end 16 of the main shaft 12. The hole saw 24 has an arbor portion 26. The arbor portion 26 has an internal end 28 extending inwardly of the second end 16 of the main shaft 12 for being engaged by the screw 20 extending within the threaded hole 18. A cylindrical side wall of the hole saw 24 has a pair of diametrically opposed slots 30 therethrough.

A sleeve 32 is slidably disposed on the main shaft 12. The sleeve 32 has an internally threaded open first end 34, an intermediate hollow chamber 36 and a closed second end 38. The internally threaded open first end 34 is dimensioned for coupling with a saddle valve 40.

In use, the saddle valve 40 would be attached to the water line 42 to be tapped. The present invention would then be threaded onto the saddle valve 40 by sliding the sleeve 32 along the main shaft 12 for engaging an externally threaded open outer end 44 of the saddle valve 40. The first end 14 of the main shaft 12 is then secured to the electric drill. The valve 46 on the saddle valve 40 would be opened so that the hole saw 24 could bore into the water line 42. After drilling, the hole saw 24 and the main shaft 12 would be moved away from the saddle valve 40 so that the valve 46 could be closed, thus completing the operation.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A water supply line tapping tool for allowing plumbers to tap into a main water supply line comprising, in combination:

a main shaft having a first end and a second end, the first end being adapted for coupling with a standard portable electric drill, the main shaft having a threaded hole therein disposed inwardly of the second end, the threaded hole receiving a screw therein, the second end having an internally threaded receiving collar disposed thereon;

a hole saw coupled with the receiving collar on the second end of the main shaft, the hole saw having an arbor portion, the arbor portion having an internal end extending inwardly of the second end of the main shaft for being engaged by the screw extending within the threaded hole, a cylindrical side wall of the hole saw having a pair of diametrically opposed slots therethrough; and a sleeve slidably disposed on the main shaft, the sleeve having an internally threaded open first end, an intermediate hollow chamber and a closed second end, the internally threaded open first end being dimensioned for coupling with a saddle valve.

2. A water supply line tapping tool for allowing plumbers to tap into a main water supply line comprising, in combination:

a main shaft having a first end and a second end, the first end being adapted for coupling with a standard portable electric drill, the main shaft having a threaded hole therein disposed inwardly of the second end, the threaded hole receiving a screw therein, the second end having an internally threaded receiving collar disposed thereon;

a hole saw coupled with the receiving collar on the second end of the main shaft, the hole saw having an arbor portion, the arbor portion having an internal end extending inwardly of the second end of the main shaft for being engaged by the screw extending within the threaded hole, wherein a cylindrical side wall of the hole saw has a pair of diametrically opposed slots therethrough; and a sleeve slidably disposed on the main shaft for coupling with a saddle valve.

3. A water supply line tapping tool for allowing plumbers to tap into a main water supply line, comprising, in combination:

a main shaft having a first end and a second end, the first end being adapted for coupling with a standard portable electric drill, the main shaft having a threaded hole therein disposed inwardly of the second end, the threaded hole receiving a screw therein, the second end having an internally threaded receiving collar disposed thereon;

a hole saw coupled with the receiving collar on the second end of the main shaft, the hole saw having an arbor portion, the arbor portion having an internal end extending inwardly of the second end of the main shaft for being engaged by the screw extending within the threaded hole; and a sleeve slidably disposed on the main shaft for coupling with a saddle valve, wherein the sleeve has an internally threaded open first end, an intermediate hollow chamber and a closed second end, the internally threaded open first end is dimensioned for coupling with the saddle valve.

* * * * *